United States Patent [19]
Dodd

[11] Patent Number: 5,135,274
[45] Date of Patent: Aug. 4, 1992

[54] STORAGE BUMPER AND DRAWER

[76] Inventor: Russell H. Dodd, 21207 S.E. 436th #C, Enumclaw, Wash. 98022

[21] Appl. No.: 710,281

[22] Filed: Jun. 4, 1991

[51] Int. Cl.⁵ ........................................... B62D 43/00
[52] U.S. Cl. .................................. 293/117; 293/106; 224/42.06; 414/466
[58] Field of Search .................... 293/117, 106, 28, 29; 224/42.05, 42.04, 42.06, 42.23; 414/463, 466; 296/37.2

[56] References Cited

U.S. PATENT DOCUMENTS

| | | | |
|---|---|---|---|
| 3,501,190 | 3/1970 | McCrea | 293/69 |
| 3,554,415 | 1/1971 | Woods | 297/42.05 |
| 3,618,835 | 11/1971 | Terry et al. | 293/117 X |
| 3,682,360 | 8/1972 | Fletcher et al. | 224/42.05 |
| 3,698,609 | 10/1972 | Lund | 293/117 X |
| 4,228,936 | 10/1980 | Rife | 224/42.23 |
| 4,312,620 | 1/1982 | Muschalek, Jr. | 414/466 |
| 4,570,986 | 2/1986 | Sams | 293/117 |
| 4,676,415 | 6/1987 | Kennedy | 224/42.06 |
| 4,896,910 | 1/1990 | Carter | 293/117 |

Primary Examiner—Margaret A. Focarino
Assistant Examiner—Joseph D. Pape
Attorney, Agent, or Firm—Delbert J. Barnard

[57] ABSTRACT

A storage bumper (10) is secured to a mounting frame (54) which in turn is secured to vehicle frame members (56, 58). The storage bumper (10) includes a hollow interior and a central access opening (20, 24) which is formed partly in the bumper top (22) and partly in the bumper rear wall (26). A door (14) normally closes the opening (20, 24). The door (14) is swingable in position about a hinge line (30) between a closed position (FIG. 1) and an open position (FIG 2). A drawer mount (12) is supported forwardly of an upper portion of the bumper (10). A drawer (48) is slidably received within the drawer mount (12). The rear end (50) of the drawer (48) is substantially flush with the rear wall (40) of the bumper (10) when the drawer (48) is closed. The drawer (48) includes a handle (52) which is used for opening and closing the drawer (48). The handle (52) is grasped and pulled to move the drawer (48) rearwardly, first through the upper central interior of the bumper (10), and then out through the rear wall portion (24) of the access opening into the bumper (10). Each end of the bumper (10) mounts a work aid fixture (170, 172) which includes a vertical socket (176).

7 Claims, 7 Drawing Sheets

STORAGE BUMPER AND DRAWER

TECHNICAL FIELD

This invention relates to a storage bumper for a vehicle. More particularly, it relates to the provision of a storage bumper and a storage drawer forwardly of the bumper which is excessible through a normally closed central rear opening in the bumper.

BACKGROUND INFORMATION

It is known to provide a vehicle with a bumper that is constructed to serve as a storage container for tools, etc. An example bumper of this type is shown by U.S. Pat. No. 4,570,986, granted Feb. 18, 1986 to Jimmie L. Sams. It is also known to provide a vehicle with a storage drawer which is positioned forwardly of a rear bumper. U S. Pat. No. 3,682,360, granted Aug. 8, 1972 to Earl B. Fletcher and Almon L. Lawson discloses a drawer that is attached to the rear bumper and extends forwardly from the bumper. The bumper forms the rear end of the drawer. The entire bumper is movable with the drawer, rearwardly to open the drawer and forwardly to close the drawer. U.S. Pat. No. 4,676,415, granted Jun. 30, 1987 to Albert B. Kennedy discloses providing a storage drawer which extends forwardly of a lower central portion of a rear bumper. The central portion of the bumper moves with the drawer during opening and closing of the drawer.

A principal object of the present invention is to provide a combined storage bumper and drawer which better utilizes the storage space available at the rear of the vehicle than do the prior art devices.

DISCLOSURE OF THE INVENTION

A storage bumper constructed according to the present invention is basically characterized by a mounting frame which has a forward portion connectable to a lower rear portion of a vehicle frame. The bumper is attached to the mounting frame. The bumper includes a front, a rear, a top, a bottom and two ends, together defining a storage compartment. The bumper also includes a central rear opening for the storage compartment. The central rear opening includes a door which is movable between a closed position and an open position. A drawer and a drawer mount are located forwardly of the bumper. The drawer has a rear end wall which is positioned substantially at the front of the bumper when the drawer is closed. The drawer is in alignment with the central rear opening in the bumper, so that when the door is open the drawer can be moved rearwardly from its closed position, first through said bumper and then out through said rear opening, into an open position. The bumper and the drawer both provide storage space above the bottom of the bumper.

In preferred form, the mounting frame comprises a transverse main beam, e.g. a tubular beam. A forward portion of the mounting frame extends forwardly from the main beam and in preferred form comprises a pair of laterally spaced apart beam members which are connectable to laterally spaced apart vehicle frame members. The drawer mount and drawer are located between these beam members. The central rear opening in the bumper includes a top portion which is formed in the top of the bumper and a rear portion which is formed in an upper central rear portion of the bumper. The door includes a top part which covers the top portion of the central rear opening and a rear part which covers the rear portion of the central rear opening. The top part and the rear part of the door are connected together. The rear part of the door is hinge connected to a rear part of the bumper.

According to an aspect of the invention, the mounting frame also includes a central tubular beam which extends rearwardly through a lower central portion of the bumper to the rear of the bumper. The rear of the bumper includes an opening which is in alignment with the interior of the central tubular beam. The central tubular beam receives and supports a trailer hitch tongue. In preferred form, the drawer mount and drawer are at a level above the central tubular beam, so that the drawer moves over the central tubular beam when it is being moved between its open and closed positions. The combined storage bumper and drawer of the invention provides storage in the bumper for elongated tools and other elongated objects. The drawer can be designed like a tool chest drawer, to receive wrenches, screwdrivers, other small tools, etc.

According to another aspect of the invention, the end portions of the bumper include support sockets which may be used to support a variety of objects or fixtures adapted to help a workman perform a variety of tasks.

Further objects, features and advantages of the invention are hereinafter disclosed in the description of the best mode.

BRIEF DESCRIPTION OF THE DRAWINGS

Like reference numerals are used to designate like parts throughout the several views of the drawings, and.

BEST MODE FOR CARRYING OUT THE INVENTION

Figure 1:
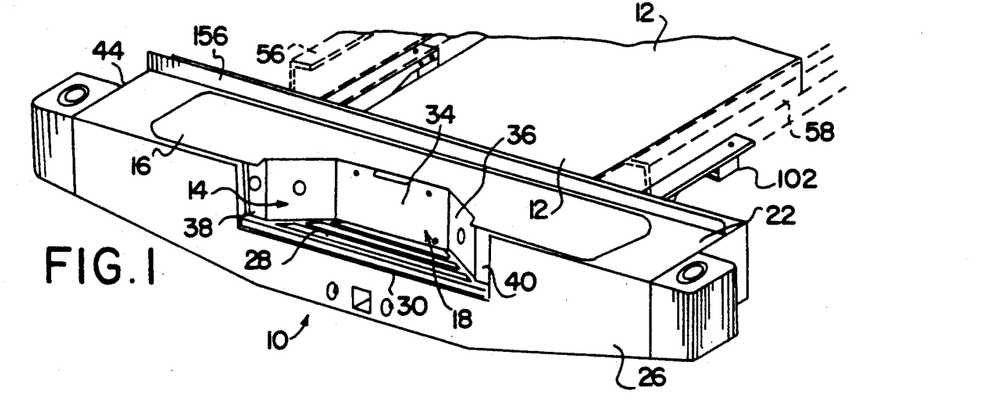
FIG. 1 is a fragmentary pictorial view of a vehicle bumper embodying the present invention, such view being taken from above and looking towards the rear and one end of the bumper, and showing the storage compartment door in a closed position.
Figure 2:
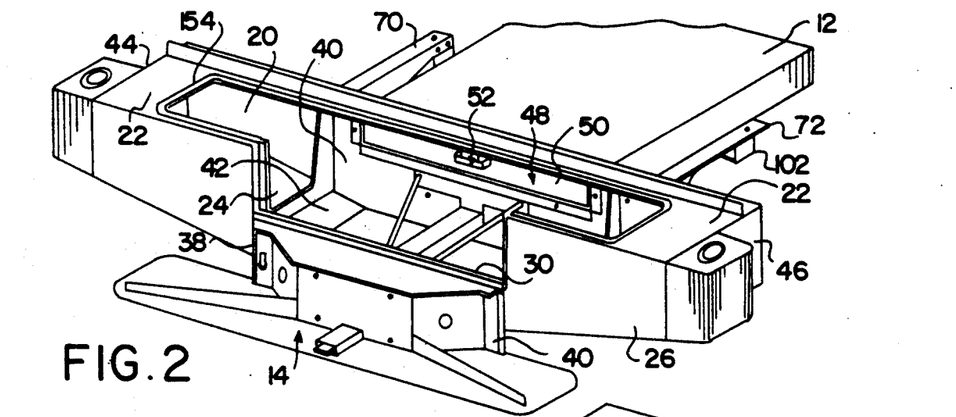
FIG. 2 is a view like FIG. 1, but showing the storage compartment door in an open position, and further showing the storage compartment drawer in a closed position.
Figure 3:
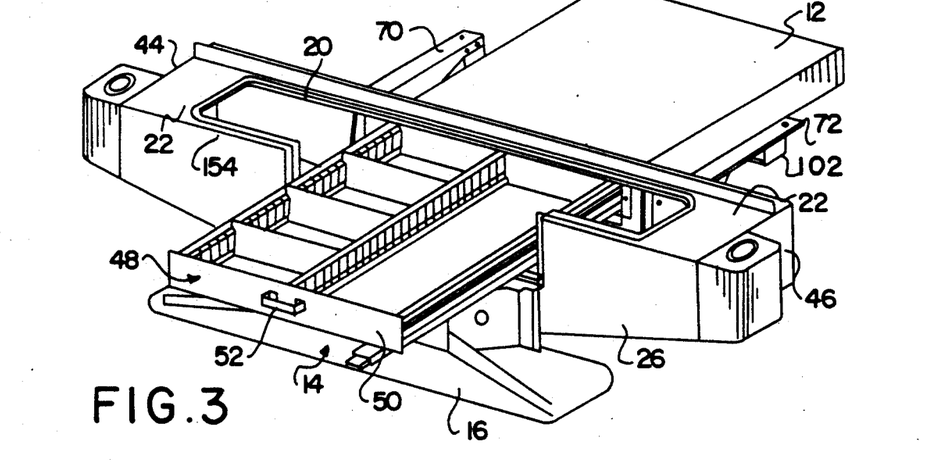
FIG. 3 is a view like FIGS. 1 and 2, but showing the storage compartment door in an open position and the storage drawer in an open position.

Referring to FIG. 1, a hollow storage bumper 10 is shown positioned rearwardly of a drawer mount 12. Bumper 10 includes a door 14 which in FIG. 1 is in a closed position. Door 14 includes a top part 16 and a rear part 18. As shown by FIG. 2, top door part 16 covers a top opening 20 in bumper top wall 22. Rear door part 18 closes a rear opening 24 in bumper rear wall 26. In preferred form, bumper 10 includes a step 28 built into door 14. Step 28 extends horizontally forwardly into bumper 10 from a hinge line 30. The rear edges of step 28 are secured to lower edges of vertical panels 32, 34, 36 which together form door rear part 18. The upper edges of panels 32, 34, 36 are connected to door top part 16. Panels 32, 36 are outwardly flanked by panels 38, 40. When door 14 is in its open position (FIG. 2) panels 38, 40 contact lower central regions of bumper rear wall 26. This contact braces the door 14 when it is in its open position. When door 14 is open, top opening 20 and rear opening 24 together provide easy access to the interior of bumper 10. As shown by FIG. 2, storage bumper 10 can be used to store elongated tools or other elongated articles. The elongated articles are easily moved into and out from the storage compartment through top opening 20. The opening of door 14 also provides access to a storage drawer 48. The rear end 50 of drawer 48 is substantially flush with bumper forward wall 40 when drawer 48 is closed. End wall 50 preferably includes a handle 52 which is pulled to move the drawer 48 into an open position (FIG. 3). FIG. 3 shows that the bumper rear opening 24 is of a width which permits movement of the drawer 48 rearwardly through opening 24. As pictured, drawer 48 may include compartments for receiving various types of tools, e.g. wrenches, screwdrivers, pry bars, etc.

Figure 4:
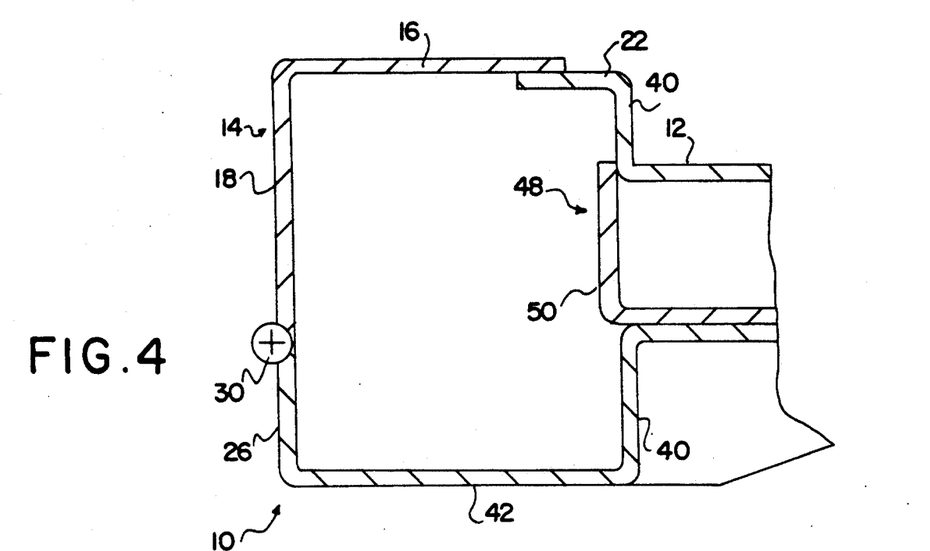
FIG. 4 is a diagrammatic cross-sectional view of the bumper of FIGS. 1-3, showing the storage compartment door closed and the storage drawer closed.
Figure 5:
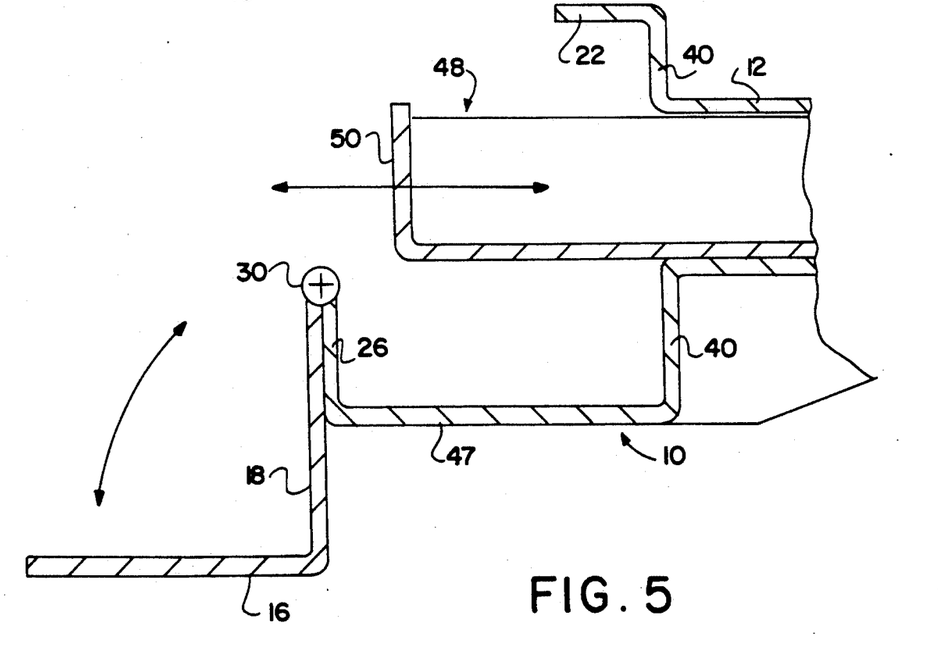
FIG. 5 is a view like FIG. 4, showing the storage compartment door open and the storage drawer in a partially open position.

FIGS. 4 and 5 are diagrammatic sectional views of the bumper 10, but with the step omitted from the door 14. Referring to FIGS. 4 and 5, the drawer 48 is shown to be positioned above bumper bottom 42. Drawer 48 is positioned straight forwardly of a middle to upper region of the bumper 10.

Figure 13:
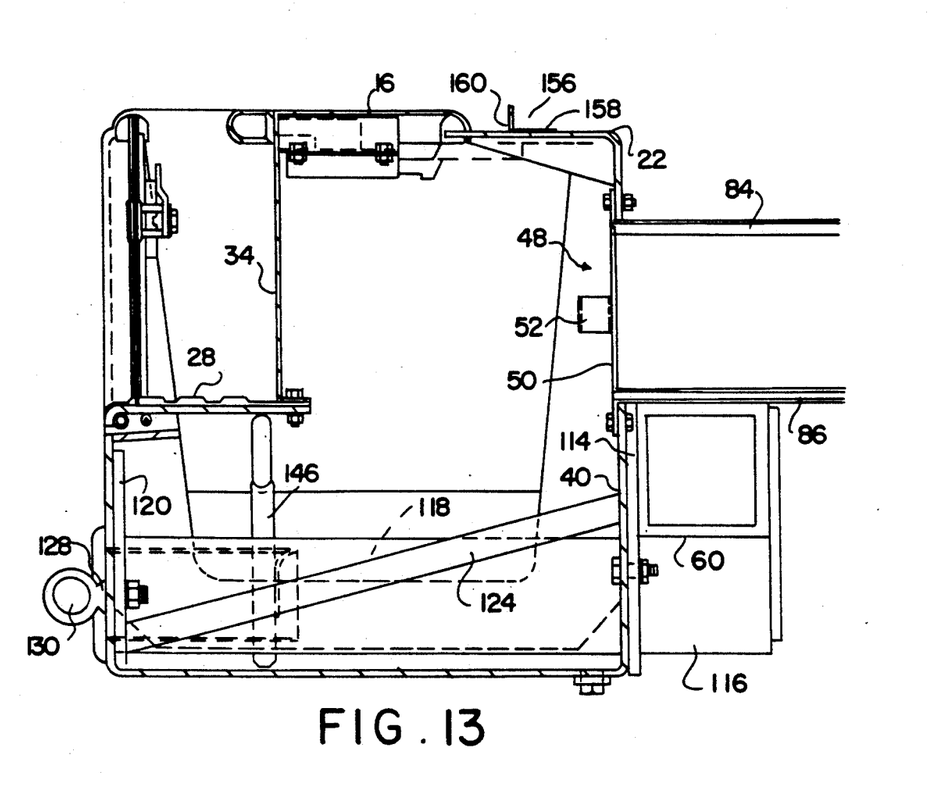
FIG. 13 is a view like FIG. 4 but of the preferred embodiment.
Figure 14:
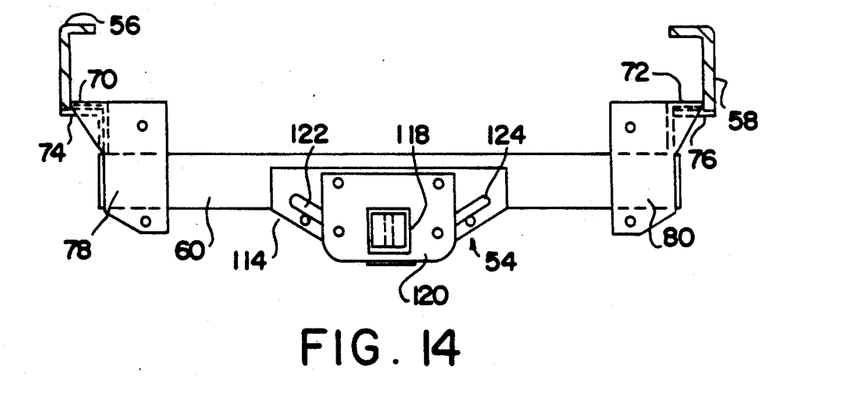
FIG. 14 is a rear elevational view of the mounting frame.
Figure 15:
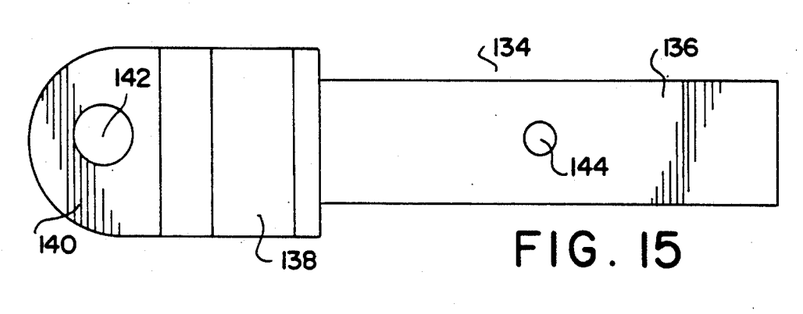
FIG. 15 is a top plan view of the trailer hitch tongue.
Figure 16:
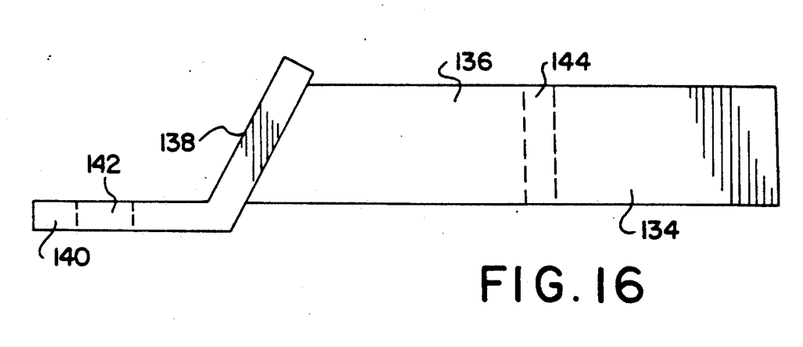
FIG. 16 is a side elevational view of the trailer hitch tongue.

Referring to FIGS. 6, 10, 12, 13 and 14, the storage bumper and drawer assembly includes a mounting frame 54 which connects bumper 10 to vehicle frame members 56, 58 (FIG. 14) and in addition supports the drawer mount 12 and the drawer 48. Mounting frame 54 is quite simple in construction. It comprises a main beam 60 which extends transversely of the vehicle. Preferably, main beam 60 is a length of tubing, for example measuring three inches by three inches in cross section. Side members 62, 64 are connected to the opposite ends of main beam 60. Each side member includes a vertical panel 66, 68 and a horizontal flange 70, 72 extending laterally outwardly from the upper edge of the panel 66, 68. As shown by FIG. 14, flanges 70, 72 set down on the lower flanges 74, 76 of vehicle frame members 56, 58. End plates 78, 80 are connected to the opposite ends of main beam 60 and to the rear ends of members 62, 64. As illustrated, plates 78, 80 are positioned rearwardly of the end portions of main beam 60. Mounting frame 54 may be secured to the vehicle frame members 56, 58 by bolts which extend through aligned openings 82 formed in flanges 70, 72 and flanges 74, 76.

Figures 11, 12:
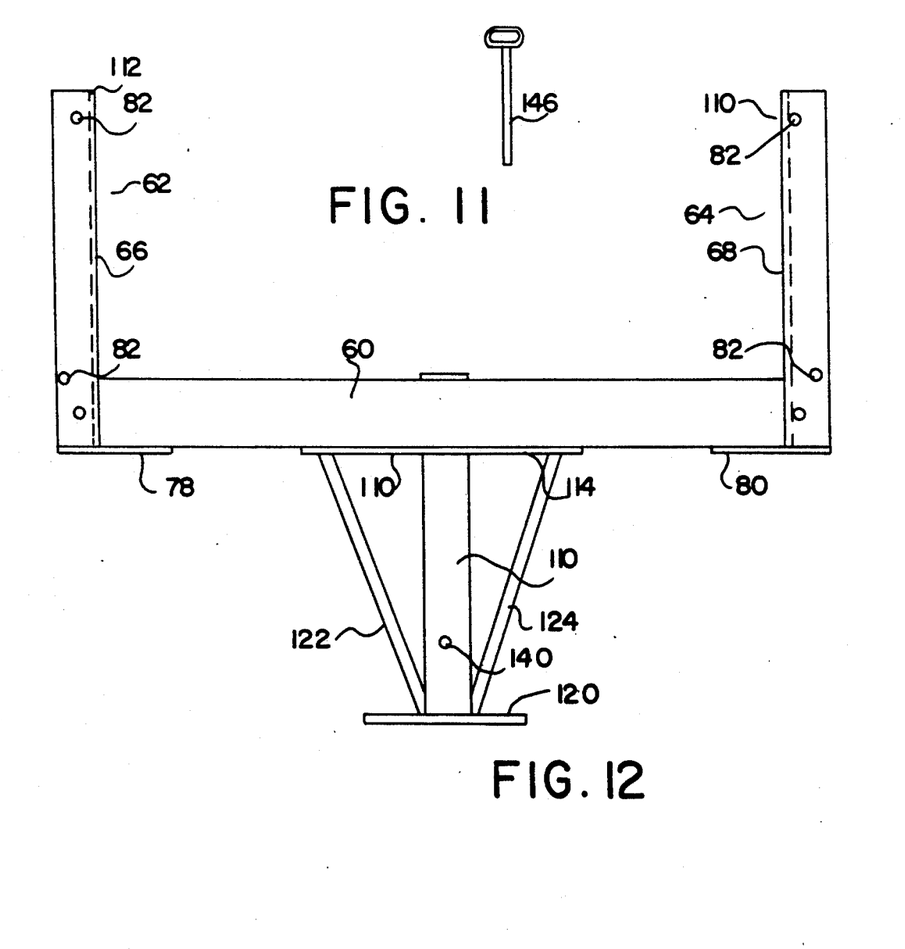
FIG. 11 is an elevational view of a pin used to secure the trailer hitch tongue to the trailer hitch beam.
FIG. 12 is a top plan view of the mounting frame.

In preferred form, the drawer mount 12 is an enclosure formed by top and bottom walls 84, 86 (Fig 13), sidewalls 88, 90 and an end wall 92. The rearward end of this enclosure is open and it is bordered by upper and lower flanges 94, 96 and side flanges 98, 100. These flanges 94, 96, 98, 100 are located in a common vertical plane. Flanges 94, 96, 98, 100 are bolted or otherwise secured to the bumper rear wall 40. If a drawer is not used, a cover plate 101 is bolted to bumper wall 40 where flanges 94, 96, 98, 100 would have been bolted. The forward portion of drawer mount 12 may be supported by a bracket 102 having end members 104, 106 and a horizontal center member 108. The end members 104, 106 are connected at their upper ends to forward portions 114, 116 of frame members 62, 64. The horizontal member 108 extends below the drawer mount 12 and drawer mount 12 rests on member 108. A mounting plate 114 is secured to the central portion of main beam 60 (e.g. FIG. 6). Plate 114 projects downwardly below main beam 60 and surrounds a lower forward portion 116 of a tube 118. Portion 116 of tube 118 is welded or otherwise secured to the main beam 60. As best shown by FIGS. 11 and 12, tubular member 118 projects rearwardly from its attachment to main beam 60 and at its rear end includes a mounting plate 120. Tube 118 is supported by a pair of diagonal braces 122, 124. Brace 122 extends rearwardly from an upper corner portion of plate 114 to a lower portion of plate 120, adjacent the rear end of tube 118. In similar fashion, brace 124 extends rearwardly from the upper opposite corner region of plate 14 to a lower region of plate 120 adjacent the rear end of tube 118.

Figure 6:
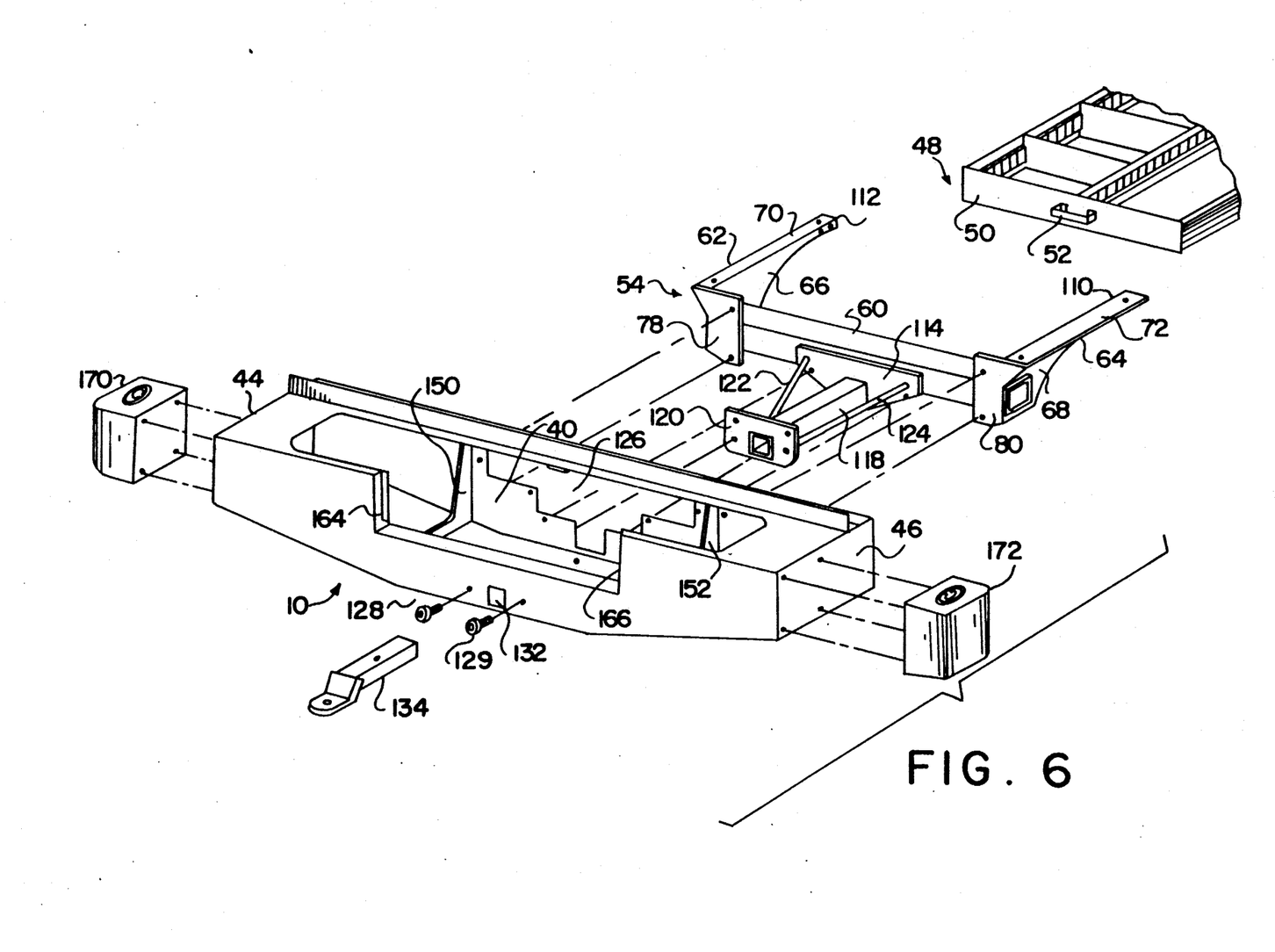
FIG. 6 is an exploded pictorial view of the bumper body, the mounting frame, the drawer, the trailer hitch tongue, and the end pieces of the bumper.

As best shown by FIG. 6, the rear wall 40 of bumper 10 includes a central opening 126 through which the tube 118, plate 120 and braces 122, 124 can extend. Bumper 10 and mounting member 54 are moved relatively together, and the tube assembly is moved through opening 126, until plate 120 is against bumper front wall 26 and bumper rear wall 40 is against plates 78, 80 and 114. Bumper wall 26 is then bolted to plate 120 and bumper wall 40 is bolted to plates 78, 80, 114. In this manner the bumper 10 is secured to the mounting frame 54 and in turn to the vehicle frame members 56, 58. As best shown by FIG. 13, eyebolts 128 may be used to secure bumper wall 26 to mounting plate 120. This is preferred because the use of eyebolts 128 provide eyes 130 which may be used to receive a tiedown line.

Bumper rear wall 26 includes a lower central opening 132 which is in alignment with the hollow center of tube 118 when mounting plate 120 is connected to bumper wall 26. This opening 132 provides a rear avenue into tube 118. Tube 118 functions as a mount for a trailer hitch tongue 134. Trailer hitch tongue 134 includes an elongated rectangular body 136, and an outer end member 138 having a horizontal shelf 140 which includes a vertical opening 142. Opening 142 receives a bolt used to mount a trailer hitch ball onto shelf 140. The elongated body 136 includes a vertical pin opening 144. (FIGS. 11 and 13). The forward end of body 136 is aligned with opening 132 and then the trailer hitch tongue 134 is moved forwardly into tube 118 until opening 144 in body part 136 is in alignment with opening 148 in tube 118. Then, lock pin 146 is inserted downwardly through the aligned openings 148, 144, to lock trailer hitch tongue 134 to tube 118.

As shown by FIG. 6, the storage bumper may include a pair of internal ribs 150, 152. Ribs 150, 152 are substantially U-shaped in side elevation (FIG. 13). A first vertical leg of each rib is secured to bumper rear wall 36. A second vertical leg is secured to the bumper front wall 40'. The interconnecting lower portion of the rib is connected to the bottom 42. These ribs, together with the wall portions of the bumper 10, provide a strong structure while at the same time providing a substantial amount of storage space within bumper 10.

Figure 7:
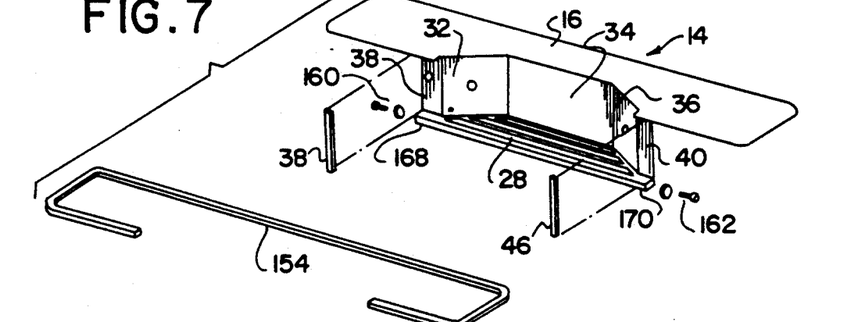
FIG. 7 is an exploded pictorial view of the storage compartment door, a seal and bolts which form a hinge connection between the door and the bumper body.
Figure 8:
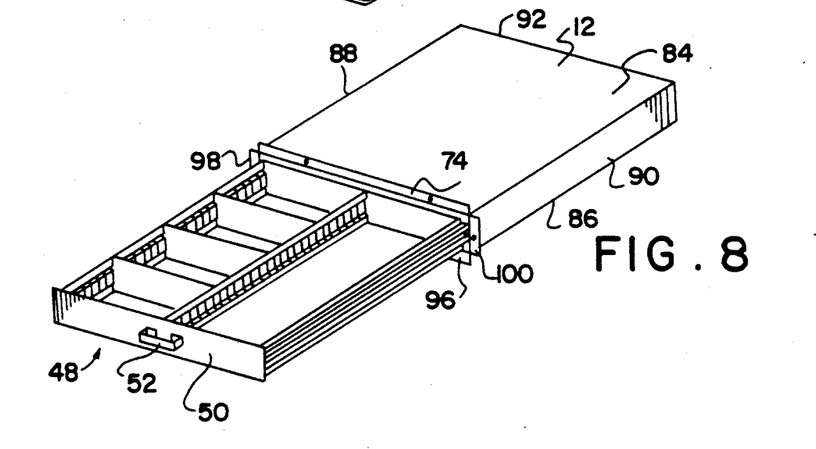
FIG. 8 is a pictorial view of the storage drawer and its housing.
Figure 9:
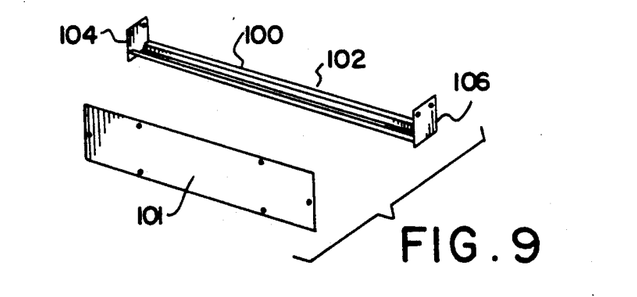
FIG. 9 is a pictorial view of a drawer support frame.
Figure 10:
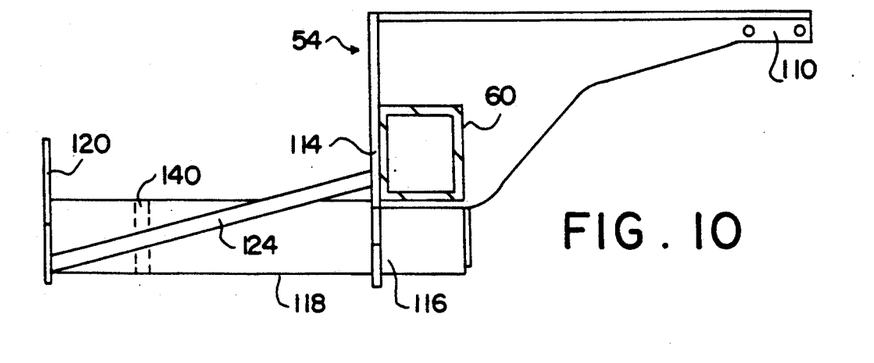
FIG. 10 is a side elevational view of the mounting frame.

In preferred form, the perimeter of top opening 20 is provided with a seal 154 (FIGS. 2, 3 and 7). Vertical seal strips 155 are provided in contact with panels 38, 40. A trim strip 156 may be provided on top of the bumper 10, adjacent the front end of the bumper. As shown by FIG. 13, trim strip 156 has a horizontal leg 158 which rests on bumper top 22 and an upstanding vertical leg 160. When bumper 10 is mounted, leg 160 extends upwardly from bumper top 22 towards an adjacent rear portion of the vehicle. Hinge line 30 may be provided by a pair of coaxial bolts 160, 162 which extend through openings in lower end portions of flanges 164, 166. The heads of the bolts 160, 162 are located on the inside of the flanges 164, 166. The threaded portions of the bolts 160, 162 thread into threaded openings formed in corner portions 168, 170 of step 28. Step 28 may be covered with a matt having a nonslip surface.

Various modifications may be made in essentially all parts of the storage bumper and drawer assembly. The embodiment which has been illustrated and described is submitted for purposes of facilitating and understanding of the invention. The scope of protection is not to be limited by such embodiment, but only by the appended claims, interpreted in accordance with established rules of patent claim interpretation, including use of the doctrine of equivalents.

What is claimed is:

1. A storage bumper for a vehicle, comprising:
   a mounting frame having a forward portion connectable to a lower rear portion of a vehicle frame;
   a bumper attached to the mounting frame, said bumper having a front, a rear, a top, a bottom and two ends, together defining a storage compartment;
   said bumper including a central rear storage compartment opening;
   a door operatively associated with said central rear opening movable between a closed position and an open position;
   a drawer mount forwardly of the bumper;
   a drawer mounted by said drawer mount, said drawer having a rear end wall which is positioned substantially at the front of the bumper when the drawer is closed; and
   said drawer being in alignment with the central rear opening in said bumper, so that when the door is open the drawer can be moved rearwardly from its closed position, through said rear opening to an open position.

2. A storage bumper according to claim 1, wherein said central rear opening includes a top portion which is formed in the top of the bumper and a rear portion which is formed in an upper rear portion of the bumper, and said door includes a top part which covers the top portion of the central rear opening and a rear part which covers the rear portion of the central rear opening, said top part and said rear part of the door being connected together, and said bumper including a hinge connection between the rear part of the door and the rear of the bumper.

3. A storage bumper according to claim 1 wherein the mounting frame has a central tubular beam which extends rearwardly through a lower central portion of the bumper to the rear of the bumper, said rear of the bumper including an opening in alignment with said central tubular beam, said opening and said central tubular beam serving to receive and support a trailer hitch tongue.

4. A storage bumper according to claim 1, wherein said mounting frame comprises a transverse main beam, and said forward portion of the mounting frame extends forwardly from said main beam.

5. A storage bumper according to claim 4, wherein the forward portion of the mounting frame comprises a pair of laterally spaced apart beam members which are connectable to laterally spaced apart vehicle frame members.

6. A storage bumper according to claim 5, wherein the mounting frame has a rear portion in the form of a central tubular beam which extends rearwardly from the main beam, through a lower central portion of the bumper, to the rear of the bumper, and the rear of the bumper includes an opening in alignment with said central tubular beam, said opening and said central tubular beam serving to receive and support a trailer hitch tongue.

7. A storage bumper according to claim 6, comprising a pair of diagonal brace members extending rearwardly from the main beam to a rear end portion of the central tubular beam.

* * * * *